(No Model.)
K. S. HAWK.
STRAW OR HAY HOOK.
No. 498,391. Patented May 30, 1893.
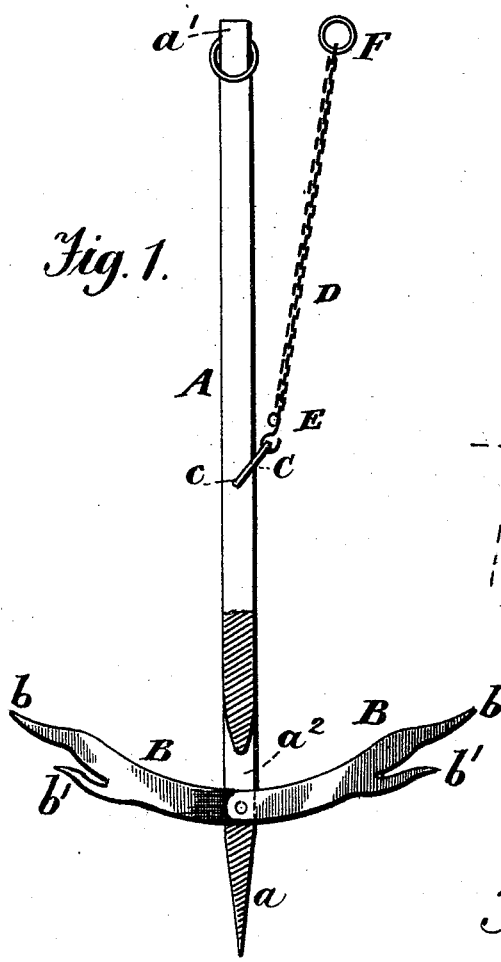
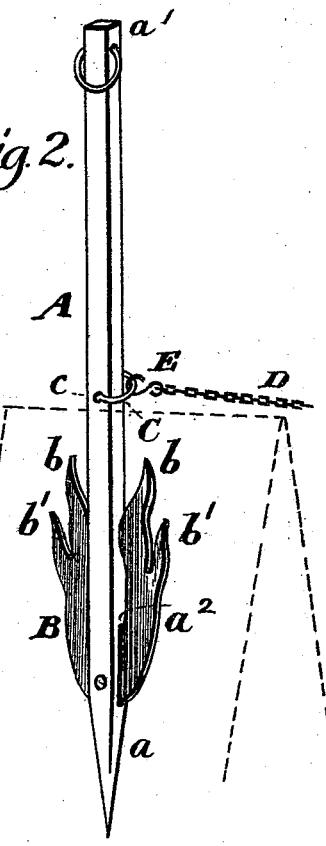
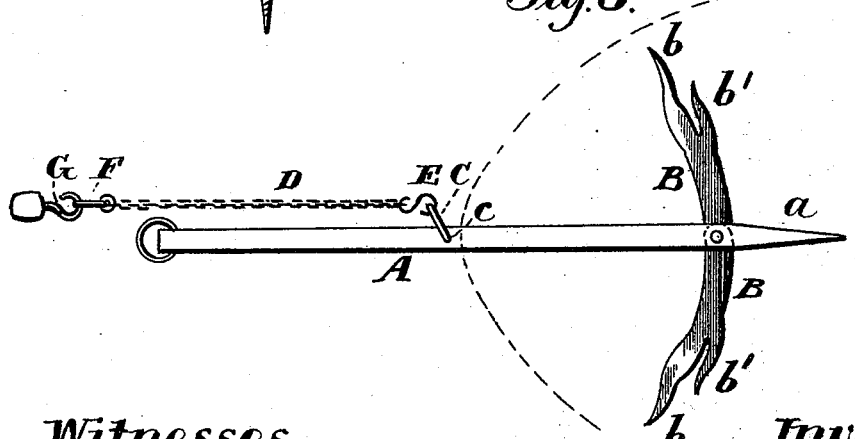
Witnesses.
A. Ruppert
H. A. Daniels
Inventor:
Kendall S. Hawk,
Per
Thomas P. Simpson,
Atty.

UNITED STATES PATENT OFFICE.

KENDALL S. HAWK, OF NEAR MECHANICSBURG, OHIO.

STRAW OR HAY HOOK.

SPECIFICATION forming part of Letters Patent No. 498,391, dated May 30, 1893.

Application filed January 14, 1893. Serial No. 458,366. (No model.)

*To all whom it may concern:*

Be it known that I, KENDALL S. HAWK, a citizen of the United States, residing near Mechanicsburg, in the county of Champaign and State of Ohio, have invented certain new and useful Improvements in Straw or Hay Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a vehicle fork or hook which may be driven perpendicularly into a rick or stack of hay or straw, as is done by hand with a common fork, so that as large a bunch as possible may be lifted off and transported by a horse or horses to the required distance for use or distribution.

Figure 1 of the drawings is a plan view of the horse-fork; Fig. 2 a perspective view, showing the fork driven perpendicularly into the section of a rick of hay or straw the dotted lines showing approximately the form of the hay or straw rick and the line of section, and Fig. 3 a side-elevation, showing the bunch of hay or straw after being pulled over and how it is drawn along in dotted lines.

In the drawings, A represents a straight rod with the pointed end $a$ and, near thereto, the slot $a^2$. The end $a'$ is preferably made blunt or transversely flat so as to be conveniently driven by a maul or hammer into the hay or straw.

B B are tines pivoted in slot $a^2$ so as to set close to the sides of the rod A while entering the rick or stack and expand to or nearly to a right angle as soon as pulled in an opposite direction. The point $a$ forms the middle tine of the horse-fork and is of course rigidly in line with the rod A at all times. I preferably curve the wings and provide them with the outwardly projecting points $b\ b'$ but this form is not necessary to the operation. These wings or tines B B are made of steel plates as thin as is consistent with the desired strength so as to make as little resistance as possible to their passage through the hay or straw.

C is a link of metal pivoted in the rod A at $c$ and carrying a draft-chain D which may have a snaphook E at one end and a ring F at the other to receive the hook G of the single tree. I may use two forks and two horses so as to take a larger section from the rick.

What I claim as new, and desire to protect by Letters Patent, is—

A rod having one end blunt and the other pointed and the slot $a^2$ next to the point, two expansible wings on a fixed pivot in said slot, and a draft-ring between said slot and the drive-end $a'$, all combined to form a draft-fork adapted to be driven vertically into a rick or stack, pulled into a horizontal position by a horse, and then dragged to its destination.

In testimony whereof I affix my signature in presence of two witnesses.

KENDALL S. HAWK.

Witnesses:
W. C. PANGBORN,
C. S. PANGBORN.